July 29, 1952     H. M. SCHWEIGHOFER ET AL     2,604,965
AUTOMATIC SHAFT POSITIONING APPARATUS
Filed July 26, 1949     3 Sheets-Sheet 1
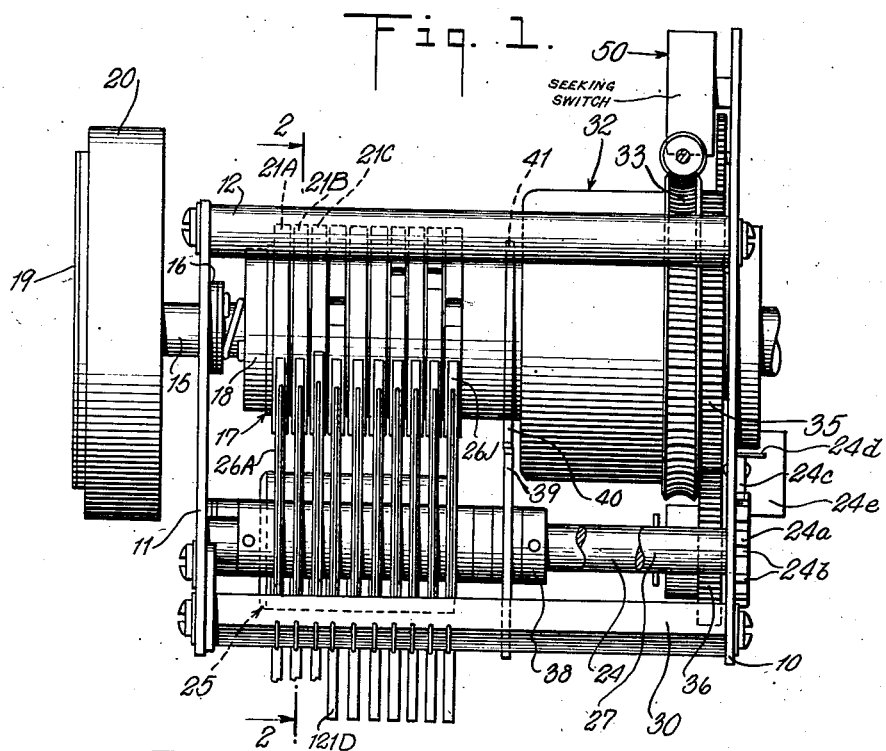
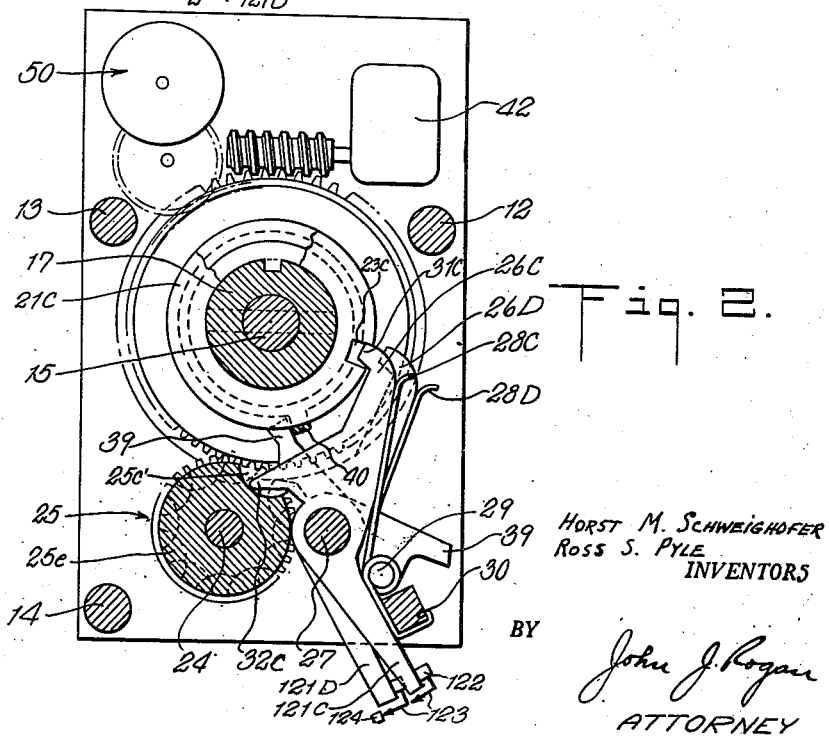
Horst M. Schweighofer
Ross S. Pyle
INVENTORS
BY John J. Rogan
ATTORNEY

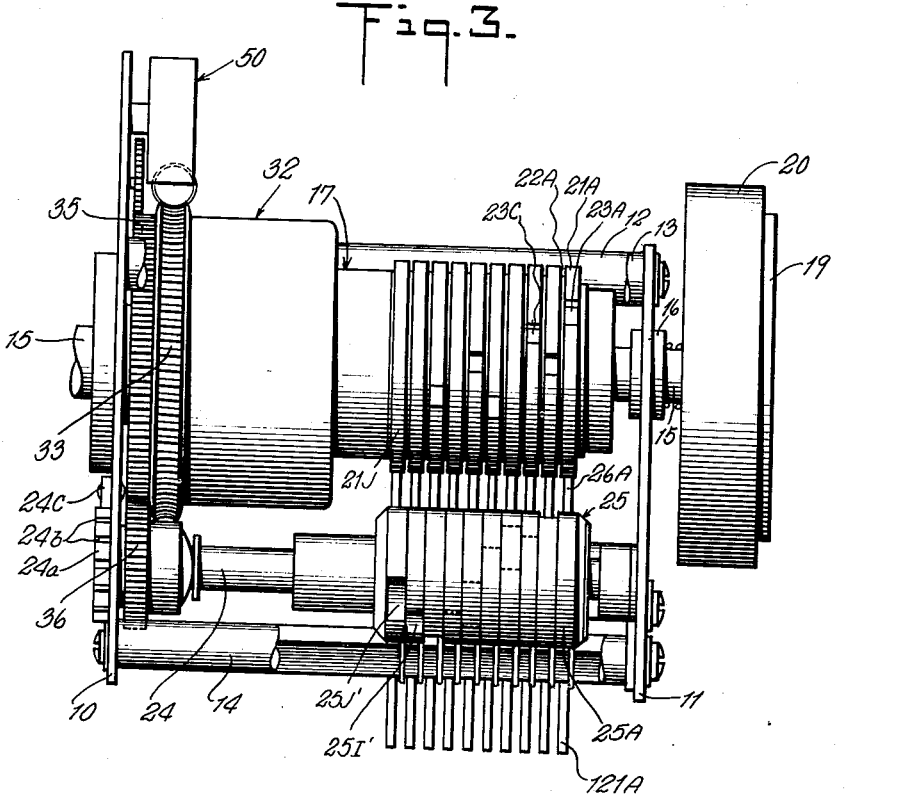
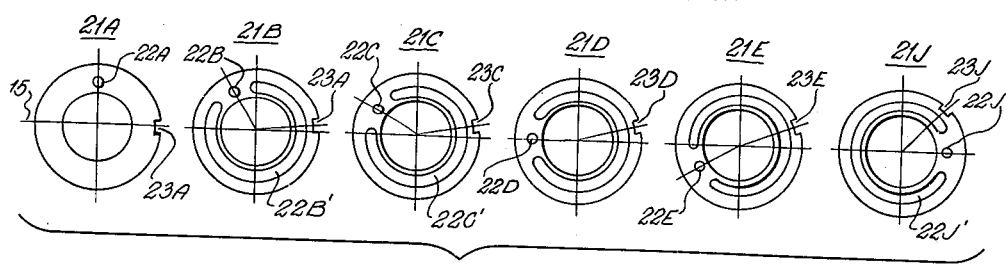

July 29, 1952 H. M. SCHWEIGHOFER ET AL 2,604,965
AUTOMATIC SHAFT POSITIONING APPARATUS
Filed July 26, 1949 3 Sheets-Sheet 3
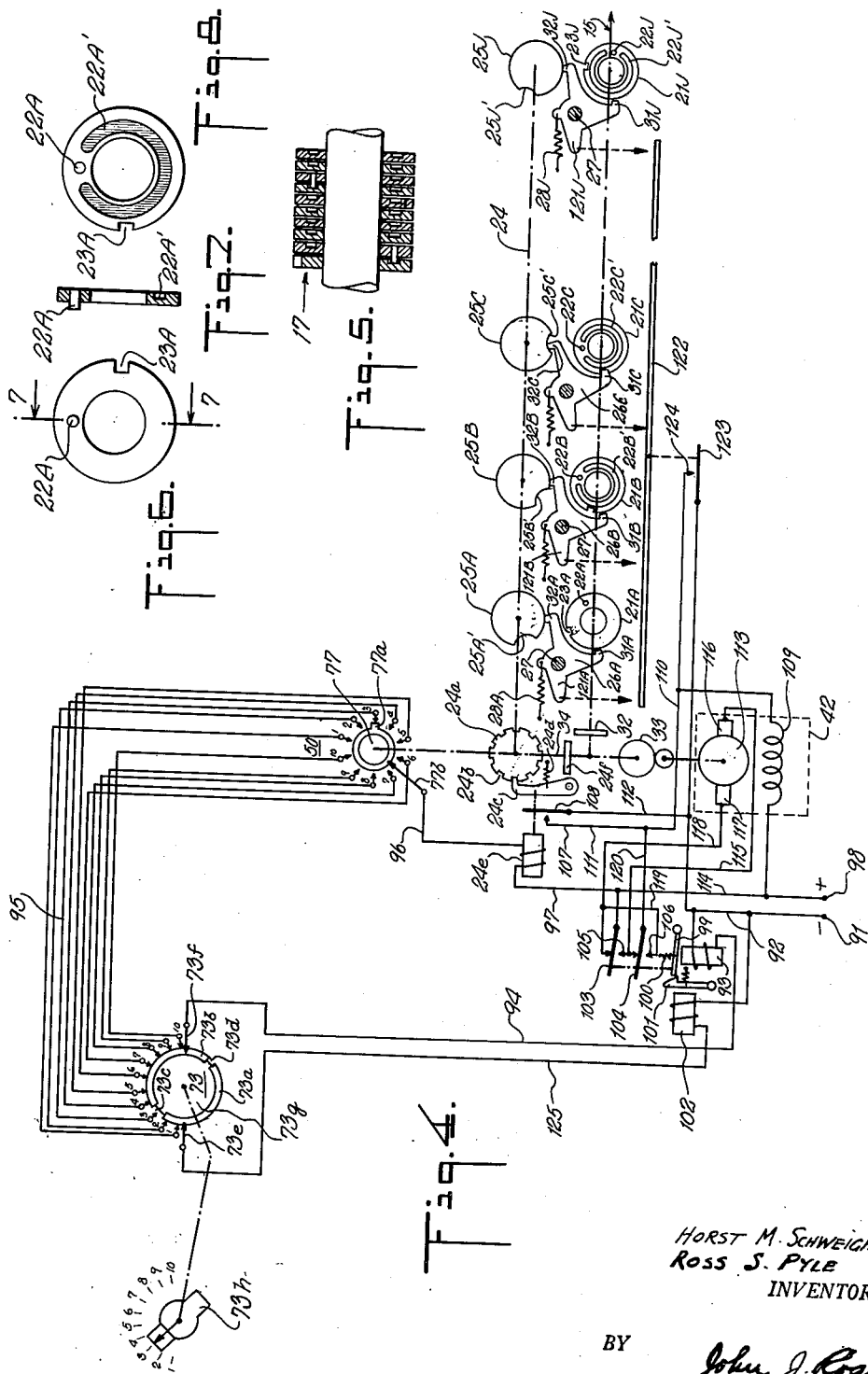
HORST M. SCHWEIGHOFER
ROSS S. PYLE
INVENTORS
BY John J. Rogan
ATTORNEY Patented July 29, 1952

2,604,965

UNITED STATES PATENT OFFICE 2,604,965

AUTOMATIC SHAFT POSITIONING APPARATUS

Horst M. Schweighofer and Ross S. Pyle, Cedar Rapids, Iowa, assignors to Collins Radio Company, Cedar Rapids, Iowa, a corporation of Iowa Application July 26, 1949, Serial No. 106,945

14 Claims. (Cl. 192—142)

This invention relates to selective shaft rotation apparatus, and more particularly to arrangements for selectively controlling the angular orientation of a shaft by remote means.

The invention is in the nature of an improvement upon the type of shaft controlling mechanism disclosed and claimed in various prior patents, of which U. S. Patent No. 2,285,414, granted June 9, 1942 to Arthur A. Collins, is typical.

The invention is also in the nature of an improvement upon the type of shaft controlling mechanism disclosed and claimed in application Serial No. 639,198, filed January 5, 1946, now Patent No. 2,585,955, issued February 19, 1952.

The general type of control mechanism disclosed in said patent requires that the shaft which is to be selectively set, must first rotate to a "home" position or stop, and then its direction of rotation is automatically reversed until it arrives at the desired final setting. While this prior arrangement has been found very successful in most fields of use, it is not entirely desirable where, for practical requirements, the shaft which is to be controlled cannot be first brought to a "home" position in moving from a previous selective setting to a subsequent selective setting. For example, in the automatic control of the flight of aircraft, guided missiles and the like whose direction, speed, altitude, or attitude, is to be automatically controlled, it is not ordinarily feasible to rotate the shaft which is to be controlled to a "home" position or stop for each successive control operation or cycle.

Accordingly, one of the principal objects of this invention is to provide an automatic shaft positioning control mechanism which automatically rotates the shaft in either direction from a previous selective setting to a subsequent selective setting without requiring it to go to a "home" position in order to complete the setting.

The type of device disclosed in prior application Serial No. 639,193, now Patent No. 2,585,955, issued February 19, 1952, represents a modification of the device of the said Patent #2,285,414, in that the shaft to be controlled rotates in only one direction. While this latter improvement represents a simplification in the control mechanism, it does not permit the mechanism to operate in the most expeditious manner. For example, if the shaft is designed to rotate in a clockwise direction, it may require almost an entire revolution for it to reach a succeeding setting, when the succeeding setting is closely adjacent the previous setting (when considered counter-clockwise), but is widely spaced from the previous setting (when considered clockwise).

Accordingly, another principal object of this invention is to provide a mechanism of the general type disclosed in said Patent #2,285,414, wherein the stop control mechanism for the shaft automatically rotates in a direction representing the shortest angular spacing between a previous selective setting and a subsequent selective setting.

Another object of the invention is to provide an automatic shaft positioning device of the type having a plurality of shiftable pawls, one for each setting of the shaft to be controlled, which pawls are in turn controlled by a selectively set cam drum and which cooperate with a corresponding stop ring drum, to stop the shaft in its selective setting. The stop ring drum and cam drum are provided with a motor and a directionally-sensitive motor control circuit, for causing the stop ring drum to rotate through the shortest rotational angle necessary to reach the desired selective setting.

A feature of the invention relates to the combination of a rotatable cam drum and a rotatable stop ring drum, whose joint settings determine the selective setting of any one of a series of selective shaft-stopping pawls. The direction and extent of rotation of the drums is controlled by the combination of a directionally-sensitive switch and a multi-point switch of the automatic seeking type.

Another feature relates to a novel stop ring drum for a mechanism of the kind disclosed in said Patent #2,285,414, having novel interlocked, but manually presettable, stop rings to maintain a predetermined sequential order of selective stopping of the rings with respect to assigned selective stopping positions of the shaft to be controlled.

A still further feature relates to the novel organization, arrangement, and relative interconnection of parts which cooperate to provide an improved and efficient servo mechanism employing cooperating stop rings, selector cams, and shiftable shaft-stopping pawls.

Other features and advantages not particularly enumerated, will be apparent after a consideration of the following detailed descriptions and the appended claims.

In the drawing, which represents, by way of example, one preferred embodiment,

Fig. 1 is a top plan view, partly sectional, of an arrangement according to the invention.

Fig. 2 is a sectional view of Fig. 1, taken along the line 2—2 thereof, and viewed in the direction of the arrows.

Fig. 3 is a bottom view of Fig. 1.

Fig. 4 is a schematic structural and circuit diagram of the arrangement shown in Figs. 1 to 3.

Fig. 5 is a longitudinal sectional view of the stop ring drum of Figs. 1 to 4.

Fig. 6 is a left-hand face view of one of the stop rings.

Fig. 7 is a sectional view of Fig. 6, taken along the line 7—7 thereof.

Fig. 8 is a right-hand face view of one of the stop rings.

Fig. 9 is an exploded view of the stop rings.

Referring more particularly to Figs. 1, 2 and 3, the device according to the invention is arranged as a self-contained unit mounted between end plates 10 and 11, which are held in appropriate spaced relationship by tie rods 12, 13, 14. Shaft 15 represents the shaft whose rotation and stopping is to be selectively controlled, and it is provided with suitable ball-bearings 16 mounted on the end plates 10, 11. A stop ring drum 17 is mounted on shaft 15, and has a clamping ring 18 which is capable of sliding movement along the shaft by being slidably keyed thereto. The clamping pressure on ring 18 is controlled by a rotatable handle 19 associated with a stud (not shown) coaxial with shaft 15, and threaded therein so as to cooperate with member 18. A dial 20 is fixedly mounted on shaft 15 externally of the end plate 11. Drum 17 rotatably supports on its periphery the desired number of stop rings 21A—21J. These rings are adapted to be clamped together to constitute in effect a unitary assembly or barrel by means of clockwise rotation of handle 19, which causes the rim of member 18 to be displaced to the right, as viewed in Fig. 1. The clamping pressure at the opposite end of the series of stop rings is against a flange (not shown) on drum 17. Thus by loosening the handle 19, the stop rings can be individually adjusted around the axis of drum 17, and when so adjusted, they can be clamped together as a unit by tightening handle 19. Each of the stop rings 21A—21J has a peripheral notch 23A—23J, and the peripheral orientation of each notch around shaft 15 determines a corresponding angular stopping position of that shaft when the stop ring containing that particular notch is stopped by the entry therein of the toe 31A—31J of a corresponding shiftable stopping pawl 26A—26J.

In accordance with one feature of the invention, the stop rings are interlocked by respective pins and grooves so that they can be independently and manually pre-adjusted around the axis of shaft 15 through respective angular segments. The purpose of this interlocking is to make sure that each position of shaft 15 shall progress angularly in the same direction from the preceding position. For example, let it be assumed that the shaft 15 is to operate the vertical elevators of an aircraft control, and that this control is designed to have ten different settings. It is necessary that these settings be in the following order, so far as angular rotation of shaft 15 from its first setting is concerned, namely, #1<#2<#3 ... <#10. This is necessary because the sensing control circuit of the motor that drives shaft 15 obtains its information from the respective shaft position number. If a higher numbered position of the series is to be selected for shaft 15, the motor will drive that shaft in a clockwise direction to seek the desired higher settting. If a lower numbered setting of shaft 15 is to be selected, the motor will drive that shaft in a counterclockwise direction to seek this lower setting. The manually preset positions of the rings corresponding to the series of desired shaft settings, must therefore progress in the proper angular direction. Furthermore, if an attempt is made inadvertently to set one stop ring to an improper angular position with respect to the preceding stop ring, the pin and groove interlock will automatically reset the adjacent rings to maintain the proper progressive relationship.

A typical setting of ten positions for shaft 15, expressed in angular degrees, might be as follows:

| Position | Position of Shaft 15 |
|---|---|
| | degrees |
| 1 | 0 |
| 2 | 10 |
| 3 | 15 |
| 4 | 35 |
| 5 | 250 |
| 6 | 275 |
| 7 | 295 |
| 8 | 300 |
| 9 | 330 |
| 10 | 355 |

The stop rings, by means of these cooperating pins and grooves, act somewhat similar to a stack of lost-motion members, so that each ring can be manually turned during presetting, through an angle of somewhat less than 360° relative to the adjacent ring. The complete rotation of shaft 15 is limited to a single revolution, by means of the terminal stop ring 41 which has a lug 40 adapted to engage a fixed terminal stop 39. Consequently, none of the stop rings can ever be manually preset to a point outside the single complete revolution of shaft 15, even though the total or cumulative adjustment of the several rings considered around the shaft 15 would be a multiple of 360°. In order to preserve this necessary relationship between the various stop rings, each stop ring carries on one flat face thereof a respective pin 22A—22J, the opposite face of each ring, except ring 21A, being provided with a groove 22B'—22J'. These grooves have the same radius as the radial location of the respective pins on the next adjacent disc, as shown more clearly in Figs. 5, 7, 8 and 9. As shown more clearly in the exploded view of Fig. 9, each stop ring has its groove of the same arcuate length, and the pin is located midway between the ends of the groove on each stop ring. However the angle "a" between the interlocking pin and the stopping notch 23A on each ring, is different for successive rings. For example, considering stop ring 21A as being in the #1 (or zero) position, the angle "a" may be 90°, whereas the angle "a" for the next stop ring 22B may be 115°, and so on for the remaining rings, the angle "a" increasing by 25° for each ring.

In Fig. 9, the first stop ring 21A is in a position wherein the stopping notch 23A represents the initial or zero setting of shaft 15. The remaining rings 21B—21J are shown in Fig. 9 in their minimum settings (that is, for a minimum incremental angle of 5° between adjacent rings), so that under this assumption the minimum setting for ring 21J is 45°. Consequently, if the length of the grooves is 300°, the maximum setting between adjacent rings is limited by the length of the groove plus 5°. Thus the maximum setting for ring 21J will be 355°. Any of the preceding rings may be set to any value from 5° to 305° higher than the preceding ring, and 5° to 305° lower than the succeeding ring. If any attempt is made inadvertently to set one ring to an improper angular value with respect to the adjacent ring, the above described pin and groove interlock system will automatically reset the adjacent ring to maintain the proper relationship. This will be clear from the following:

| Selective Position of Shaft 15 | Initial (proper) Setting | Attempted Change | Resulting Change |
|---|---|---|---|
| | degrees | degrees | degrees |
| 4 | 125 | 125 | 125 |
| 5 | 160 | 190 | 190 |
| 6 | 185 | 185 | 195 |
| 7 | 200 | 200 | 200 |

Note that in attempting to set position #5 to a higher value than #6, #6 will be pushed by the pin and groove to a corresponding higher value. If position #5 were set still higher, #7 would also be affected, and so on.

Mounted in spaced parallelism to shaft 15 is another shaft 24, which carries the selector cam drum 25 consisting of cams 25A—25J, each planarly aligned respectively with a corresponding stop ring 21A—21J. These cams are fixedly mounted on shaft 24 and each has an arcuately curved recess 25A'—25J' in its periphery, the recesses being arranged so that their centers or low points are located on a helical path around the periphery of the cam drum. Each of these recesses is, in accordance with one feature of the invention, in the form of a circular arc which cooperates with the corresponding heel 32A—32J of the corresponding pawl 26A—26J. As a result of the helical arrangement of the recesses 25A'—25J', they serve to preselect any corresponding particular one of a series of stopping pawls 26A—26J. Each of the pawls is planarly aligned with a corresponding stop ring and with a corresponding cam. The pawl 26C is shown in shaft stopping position, wherein its heel 32C is riding on the low part of the cam recess 25C', thus permitting the toe 31C to enter the slot 23C in stop ring 21C when the ring rotates to bring slot 23C into registry with toe 31C. Each pawl is provided with one of a series of wire springs 28A—28J, each spring being looped around the fixed rod 29 and having its lower end (Fig. 2) in engagement with the rectangular bar 30 extending between the plates 10 and 11. The upper end of each spring engages the edge of the corresponding pawl, thus tending to rotate the pawl counter-clockwise as seen in Figs. 2 and 4. It will be clear from the foregoing arrangement that the toe of any pawl cannot completely enter a notch in the corresponding stop ring until the heel of that pawl is riding on the lower portion of the slot in the associated cam. In other words, each cam selects or prepares its associated pawl for subsequent stopping engagement with the corresponding stop ring.

Figs. 2 and 4 show the mechanism wherein the pawl 26C is in selected position, so that its heel 32C rests on the low portion of the slot in the associated cam, while the toe 31C is in full registry with the corresponding notch 23C. In this position each remaining pawl, for example pawl 26D, has its heel 32D resting on the non-recessed periphery of the associated cam 25D, thus preventing the toe of the pawl from registering with the slot in the corresponding stop ring. When any pawl has its toe in complete registry with a slot in a stop ring, it effectively locks the shaft 15 in the selected position. While the shaft 15 is thus positively stopped, the driving motor 42 may continue to rotate because it is coupled to the shaft 15 through the intermediary of a slip clutch 32. In order to make sure that the heels of the pawls register with the central low part of each cam slot for each selective setting of the cam drum, the shaft 24 also carries a toothed wheel 24a having a series of equally-spaced notches 24b, each angularly oriented around the shaft 24 to correspond with the center of a corresponding recess 25A'—25J'. Cooperating with the wheel 24a is a pawl 24c which by means of spring 24d, tends to engage in any notch 24b with which it comes in registry. The pawl 24c is held out of engagement with the wheel 24a by means of a relay 24e, whose armature is mechanically connected to pawl 24c.

It will be observed that the motor shaft is coupled to shaft 24 through a slit clutch 24f to allow the motor to continue rotating until it coasts to a dead stop even after the shaft 24 has been positively stopped by pawl 24c. Motor 42 drives a gear 33 which in turn drives shaft 24 through the intermediary of slip clutch 24f. A fixed terminal stop pawl 39 is mounted so as to confine the rotation of the corresponding terminal stop ring 41 fastened to shaft 15 to an angular orientation of approximately 360°.

The gear 33 also drives the metal ring rotor 77 of a selector switch 50 of the automatic seeking type. The switch 50 may be of the usual "line finder" type having a brush 77a carried by rotor 77. This switch is provided with a series of fixed bank contacts equal in number to the number of cams 25A—25J. These bank contacts are multipled over a suitable cable to corresponding fixed contacts of a selector switch 73. Cooperating with the fixed contacts of switch 73 are two circular rotary contactor segments 73a, 73b, having diametrically opposite spaced ends or gaps 73c, 73d. The fixed or bank contacts of selector switch 73 are arranged in equal spaced array around the rotary segments, and occupy an arc of somewhat less than 180 degrees. Also fixedly mounted with respect to the rotary segments 73a, 73b, are two brushes 73e, 73f, which are located diametrically opposite to each other. The segments 73a, 73b, can be attached to a suitable insulator disc or drum 73g which is provided with an adjusting handle or knob 73h for rotating the switch to any one of the ten successive positions. The arrangement is such that when the gap 73c is in registry with any of the corresponding fixed bank contacts of switch 73, the brush 77a of switch 50 is, by the automatic seeking action of switch 50, brought into registry with the corresponding fixed bank contact of switch 50, and in this relation the energizing circuit of relay 24e is open, thus permitting pawl 24c to drop into the cooperating notch 24b and stop shaft 24, and also switch rotor 77.

In accordance with the invention, the shafts 24 and 15 are arranged to be rotated in either a clockwise or counter-clockwise direction, depending upon the location between a previous setting of the gap 73c of switch 73, and the location of a subsequent or new setting. The sense of direction of rotation of shafts 24 and 15 will be determined by the relation between the fixed brushes 73e, 73f, and the orientation of the segments 73a, 73b, with respect thereto. Thus, in the particular setting shown in Fig. 4, wherein the shaft 15 is stopped in its #3 position by means of pawl 26C, the gap 73c is in registry with the #3 fixed contact of switch 73, and brush 77a is in registry with #3 fixed contact of switch 50. If, for example, it is now desired to select the #2 position for shaft 24, that is where it is stopped by pawl 26B, the knob 73g is merely turned from its #3 position counter-clockwise to its #2 position. In this setting the gap 73c is in registry with the #2 contact, and a circuit is traceable from the negative terminal 91 of the power supply, thence via conductor 92, the energizing winding of direction control relay 93, conductor 94, brush 73f, rotary segment 73b, #3 fixed contact, conductor 95, #3 fixed contact of switch 50, brush 77a, cooperating wiper brush 77b, conductor 96, winding of relay 24e, conductor 97, to the positive terminal 98 of the power supply. Relays 93 and 24e operate as a result of the closure of this circuit. Relay 93 attracts its armature 99 against the tension of spring 100, and this armature immediately latches under the latching end of armature 101 controlled by another directional control relay 102. Thus the armature 99 remains in latched position until relay 102 is operated. It should be observed that under the above assumed new setting of switch 73, no circuit is completed through the winding of relay 102. When armature 99 moves to latched position, it operates the associated movable relay contacts 103, 104, into engagement with the corresponding stationary front contacts 105, 106. At the same time, relay 24e when operated, withdraws the pawl 24c from wheel 24a, and closes the relay contacts 107, 108. As a result, a circuit is traceable from the positive terminal 98 through the field winding 109 of the motor, conductor 110, conductor 111, contacts 107, 108, conductor 112, conductor 92, to the negative terminal 91. It should be observed that the direction of current flow through the armature 113 of the motor is controlled by the contacts 103, 104, which act in the nature of a reversing switch. When relay 93 is operated as above described, it closes a circuit traceable from positive terminal 98, conductor 114, contacts 103, 105, conductor 115, armature brush 116, armature 113, armature brush 117, conductor 118, conductor 119, contacts 106, 104, conductor 120, conductor 111, contacts 107, 108, conductor 112, conductor 92, to the negative terminal 91. When the relay 93 is deenergized however, the direction of current flow through the armature 113 is reversed.

From the foregoing, it will be seen that the direction of rotation of the motor 42 and therefore of the shafts 24 and 15, is determined by the angular spacing between the previous setting of the gap 73c with respect to any subsequent desired setting, and as will be described hereinbelow, this direction of movement is such as to cause the shafts 24 and 15 to execute the least amount of rotary turning to move from the previous setting to the subsequent desired setting. However, it is important to arrange the #1 to #10 contacts of switch 73 in the same sequence as the corresponding successive positions to be controlled by the cams 25A—25J.

As a result of the turning of the motor in response to the new setting of switch 73 as above mentioned, the shaft 24 is rotated in a counter-clockwise direction, as is the brush 77a of the seeking switch 50. It will be observed that one of the reasons for making the recesses 25A'—25J' of rather shallow arcuate form, is so that the initial rotation of the shaft 24 in response to the starting of rotation of the motor 42 as above described, causes the pawl, for example pawl 26C, to be rotated clockwise, thus releasing the toe 31C and permitting shaft 15 to begin its counter-clockwise rotation almost substantially simultaneously with the rotation of shaft 24. Each of the pawls 26A—26J has an integral arm 121A—121J adapted to engage the swingable bail or bar 122. Bar 122 carries a contact member 123 which is adapted to open and close with a cooperating stationary contact 124, to provide a substitute energizing circuit for the motor which is independent of the contacts 107, 108. When all the pawls 26A—26J are in unlocked position with respect to their associated stop rings, the bar 122 maintains contacts 123, 124, closed. However, as soon as any pawl, for example pawl 26B, rotates counter-clockwise (as seen in Fig. 4), with its toe 31B in the slots 23B, the arm 122 is rocked to open the contacts 123, 124.

Since, under the above assumption, the new setting for switch 73 is that corresponding to fixed contact #2, the shaft 24 and the switch rotor 77, rotate counter-clockwise until the switch brush 77a engages #2 contact. In this condition the previously described circuit for relay 93 is broken at gap 73c, and relays 24e and 93 thereupon become deenergized. Consequently, the pawl 24c is retracted by its spring 24d in readiness to engage in the nearest notch 24B corresponding to the #2 position of shaft 24. However, the motor circuit is kept energized through contacts 107, 108, to insure that pawl 24c enters the said notch 24b to positively stop further rotation of shaft 24. Consequently, only one of the series of pawls 26A—26J, namely pawl 26B, is in condition to be rotated counter-clockwise (as seen in Fig. 4) by its spring 28B, since all the remaining pawls have their heels riding on the high part of their respective cams. However, shaft 15 may continue to rotate until the slot 23B comes into registry with pawl toe 31B, thus positively stopping shaft 15. Thereupon, the substitute motor circuit through contacts 123, 124, as above described, is broken, and the motor can coast to rest by reason of the slip clutch 32.

In the foregoing description it has been assumed that the new setting is in a counter-clockwise direction from the previous setting. If the new setting had been located in a clockwise direction from the previous setting, for example if the new setting were that corresponding to position #10 of switch 73, instead of the relay 93 being operated, an energizing circuit would be closed from the negative terminal 91 through the winding of relay 102, conductor 125, brush 73e, segments 73a, conductor 95, #3 contact of switch 50, brush 77a, wiper 77b, conductor 96, relay 24e, conductor 97 to the positive terminal 98. The energization of relay 102 operates the latch armature 101, thus permitting armature 99 to be retracted by its spring 100, and closing a reverse circuit to the motor, causing shafts 24 and 15 to rotate in the clockwise direction. The remaining sequence of operations is then similar to that above described.

The importance of coupling the adjacent stop rings 21A—21J to each other through their respective pins 22A, and grooves 22B', etc., will be clear from the foregoing. If these stop rings were entirely independently pre-adjustable around the drum 17 as in the prior Patent

2,285,414, or as disclosed in said application Serial No. 639,198, there would be no assurance that the proper sequence of settings of switch 73 would properly correspond with the sequence of settings of shaft 15. For example, let it be assumed that the shaft 15 is connected to the elevator controls of an aeroplane, assuming that these controls have been previously set in a #3 position as above described, and it is desired to cause the aeroplane to descend to a lower altitude represented for example by position #1. With the arrangements described in the said prior patent and application, the elevators would have to return to a normal or "home" position, which would result in the aeroplane having to assume some zero or base altitude before it actually descends to position #1. Likewise, if the aeroplane were desired to increase its altitude to position #7 for example, it would still be necessary for the controls to operate the aeroplane to some base or "home" position before it actually arrives at the higher altitude. In accordance with the present invention, the various positions #1 to #10 of the switch 73 are in orders of increasing spacing. In other words, in the case of an aircraft control, they would represent different altitudes, with the lowest altitude represented for example by position #1, and the highest altitude represented by position #10, and with intermediate altitudes represented by the respective intervening positions of switch 73. If the various settings of the elevator controls were equally spaced at all times, then of course the stop rings could be permanently attached to shaft 15 with the slots 23A—23J located equally around the axis of said shaft. However, in most cases the spacings between different selective settings of shaft 15 may be of unequal amounts, and yet it must be arranged that the shaft 15 must always follow the same direction of rotation as the direction of rotation of switch 73. All these conditions are met by the arrangement as above described. There is thus provided a highly accurate and flexibly adjustable automatic control arrangement for any device which is arranged to be connected to shaft 15.

It will be understood, of course, that while particular parts have been described herein, various changes and modifications may be made therein without departing from the spirit and scope of the invention.

What is claimed is:

1. Apparatus of the servo type, comprising, a member manually movable to a plurality of different positions, a shaft which is to assume different rotational settings in accordance with the positions of said manually movable member, a plurality of shaft stopping elements rotatable with said shaft, a corresponding plurality of shiftable stop members cooperating respectively with said stop elements, rotatable means for selectively setting any one of said stop members to prepare it for stopping engagement with a corresponding stop element, a rotary switch of the automatic circuit seeking type having a rotor and a plurality of bank contacts each allotted to a corresponding one of said different positions, a motor for rotating said rotatable means and for rotating said switch rotor in unison, means responsive to a changed position of said manually movable member and movable as a unit therewith to cause said motor to rotate said rotatable means and said switch rotor to correspond to said changed position, the last-mentioned means including motor control circuits completed by said manually movable member for causing said rotatable means to rotate through the shortest circular arc necessary to bring it from its original setting to the setting corresponding to said changed position, said last-mentioned means also including a centering wheel and cooperating latch for maintaining said rotatable means in rotation until said shaft is accurately centered in its desired stopping position.

2. Apparatus according to claim 1, in which said rotatable means comprises a rotatable cam drum having a series of helically arranged recesses each cooperating respectively with one of said stopping members.

3. Apparatus according to claim 1, in which said manually movable member is connected to the rotor of a multi-contact switch having a bank of fixed contacts which are respectively electrically connected to corresponding bank contacts of said rotary seeking switch.

4. Apparatus according to claim 1, in which said manually movable member is connected to the rotor of a multi-contact switch, said switch having a bank of fixed contacts arranged around the rotor in less than a semi-circular arc, said rotor also carrying a pair of substantially semi-circular contact segments with diametrically opposed gaps and a pair of diametrically opposite fixed brushes to engage said contact segments for controlling the current direction in the said motor control circuits.

5. Apparatus according to claim 1, in which said manually movable member is connected to the rotor of a multi-contact switch having a bank of fixed contacts which are respectively electrically connected to corresponding bank contacts of said rotary seeking switch, said rotor also carrying a pair of substantially semi-circular contact segments for engaging the associated bank contacts, and said multi-contact switch also having a pair of diametrically opposite gaps and a pair of diametrically opposite brushes engaging said segments, and motor circuit reversing switch means controlled by said pair of brushes to determine the direction of rotation of said motor.

6. Apparatus according to claim 5, in which said motor circuit reversing switch means comprises a pair of electromagnetic relays having their armatures arranged for mutual latching.

7. Apparatus according to claim 1, in which said motor control circuits includes motor reversing switch means, a multi-contact switch having a rotor connected to said manually movable member and also having a series of fixed bank contacts electrically connected respectively to the bank contacts of said seeking switch, said seeking switch having a rotary brush for successively engaging its bank contacts, said seeking switch also having a common wiper connectable to any of said bank contacts through said rotary brush for completing a circuit to operate said motor reversing switch means when the angular setting of said rotary brush differs from the manual setting of said manually movable member.

8. Apparatus according to claim 7, in which said rotatable means is connected to a multi-toothed stopping wheel, said wheel having a cooperating stopping pawl, and electromagnetic means for operating said stopping pawl, said electromagnetic means being also connected in circuit with said wiper.

9. Servo apparatus, comprising, a manually operable control switch having a rotor carrying a pair of substantially semi-circular contact segments with oppositely disposed gaps, a bank of fixed contacts arranged around said rotor in less than a semi-circular arc, a pair of diametrically opposite wipers for engaging said segments, a multi-point selector switch of the circuit seeking type having a rotary brush and a bank of surrounding fixed contacts, means electrically connecting the bank contacts of the control switch with the respective bank contacts of the seeking switch, a common stationary wiper for said seeking switch and connectable with of the bank contacts of the seeking switch through the rotary brush thereof, a stop control cam drum, a stop ring drum, a plurality of stop control pawls each in cooperative alignment with a cam of said cam control and a stop ring of said stop ring drum, a single reversible motor for driving said cam drum, said stop ring drum and the rotary brush of said seeking switch, means responsive to a change in setting of said control switch to cause said motor to drive said cam drum in the shortest circular arc to a stopping position determined by said seeking switch, a circuit for controlling the motor completed through said wiper, said circuit being opened upon the selective stopping of said cam drum, another substitute motor circuit for maintaining the stop ring drum rotating until it is selectively stopped by a selected one of said pawls, and a common switch for said substitute motor circuit which is opened in response to the stopping engagement of the selected pawl with its corresponding stop ring.

10. Servo apparatus according to claim 9, in which said cam drum is provided with a toothed stopping wheel, a stopping pawl for said stopping wheel, an electromagnet for operating said pawl in response to a change in setting of said control switch and for releasing said pawl to positively stop said cam drum when said seeking switch arrives at a position corresponding to the changed setting of said control switch, said motor being coupled to said cam drum and said stop ring drum through respective slip clutches to permit the stop ring drum to continue rotating in its selective direction even after said cam drum is stopped.

11. Apparatus for selectively positioning a rotatable shaft in any one of a series of desired stopping positions without requiring the shaft to go first to a home position before executing its selective rotation, comprising, a plurality of shaft stop rings each having a stopping abutment and rotatable with said shaft, a corresponding plurality of pivotally-mounted shaft stopping pawls, a corresponding plurality of pawl selecting cams, a reversible motor for selectively setting said cams to permit only a selected one of said pawls to move into stopping position with the abutment on a corresponding stop ring, a multi-point selector switch having a plurality of settings equal in number to the number of said shaft stopping positions, motor control circuits responsive to the movement of said switch from a previous setting to a subsequent setting to cause said shaft to rotate from its previous setting to its subsequent setting and through the shorter rotational angle, and means to interlock successive shaft stop rings around said shaft to maintain a progressively increasing angular orientation for each stop ring with respect to the preceding stop ring, said cams being assembled in the form of a rotatable drum, and having respective pawl receiving recesses arranged in a helical path around the drum periphery, said drum and shaft being coupled to said motor through respective slip clutches.

12. Apparatus for selectively positioning a rotatable shaft in any one of a series of desired stopping positions without requiring the shaft to go first to a home position before executing its selective rotation, comprising, a plurality of shaft stop rings each having a stopping abutment and rotatable with said shaft, a corresponding plurality of pivotally-mounted shaft stopping pawls, a corresponding plurality of pawl selecting cams, a reversible motor for selectively setting said cams to permit only a selected one of said pawls to move into stopping relation with the abutment on a corresponding stop ring, a multi-point selector switch having a plurality of settings equal in number to the number of said shaft stopping positions, motor control circuits responsive to the movement of said switch from a previous setting to a subsequent setting to cause said shaft to rotate from its previous setting to its subsequent setting and through the shorter rotational angle, and means to interlock successive shaft stop rings around said shaft to maintain a progressively increasing angular orientation for each stop ring with respect to the preceding stop ring, said cams being assembled in the form of a rotatable drum, each of said cams having an arcuately-shaped pawl receiving recess with the recesses arranged in a helical path around the drum periphery, said drum and shaft being coupled to said motor through respective slip clutches, a toothed wheel rotatable as a unit with the drum and having a series of notches each correlated with the center of a corresponding cam recess, and an electromagnetically-controlled pawl for shiftably engaging with said wheel for the purpose described.

13. Apparatus for selectively positioning a rotatable shaft in any one of a series of desired stopping positions, comprising, a plurality of shaft stop elements movable as a unit with said shaft but each individually and presettably locked at different angular orientations with respect to the shaft axis, means for interlocking successive stop elements to limit the relative angular presettability of each stop element with respect to the remaining stop elements while maintaining each stop element oriented to a greater angular extent around said shaft with relation to the orientation of the next preceding stop element, a corresponding plurality of shiftable stop members one for each of said stop elements, means to selectively set any desired one of said stop members to prepare it for stopping engagement with the corresponding stop element to stop said shaft, and means to cause said shaft to rotate in either direction as determined by the shortest rotational angle between a previous selective position of the shaft and a desired subsequent selected position thereof, said stop elements being in the form of rings each having a stopping abutment for cooperation respectively with a corresponding stop member, said rings being provided on their adjacent faces with cooperating pins and grooves to limit said angular presettability.

14. Apparatus for selectively positioning a rotatable shaft in any one of a series of desired stopping positions, comprising, a plurality of shaft stop elements movable as a unit with said shaft but each individually and presettably locked at different angular orientations with respect to the shaft axis, means for interlocking successive stop elements to limit the relative angular presettability of each stop element with respect to the remaining stop elements while maintaining each stop element oriented to a greater angular extent around said shaft with relation to the orientation of the next preceding stop element, a corresponding plurality of shiftable stop members one for each of said stop elements, means to selectively set any desired one of said stop members to prepare it for stopping engagement with the corresponding stop element to stop said shaft, and means to cause said shaft to rotate in either direction as determined by the shortest rotational angle between a previous selective position of the shaft and a desired subsequent selected position thereof, and said limiting means limits the presettability of each stop ring through a maximum angle of somewhat less than 360°.

HORST M. SCHWEIGHOFER.
ROSS S. PYLE.

REFERENCES CITED

The following references are of record in the file of this patent:

UNITED STATES PATENTS

| Number | Name | Date |
|---|---|---|
| 615,441 | Emmerick et al. | Dec. 6, 1898 |
| 1,564,872 | McMullen | Dec. 8, 1925 |
| 1,798,044 | Somajni | Mar. 24, 1931 |
| 2,263,989 | Hill et al. | Nov. 25, 1941 |
| 2,285,414 | Collins | June 9, 1942 |
| 2,299,082 | Elliott | Oct. 20, 1942 |
| 2,436,068 | Hegy | Feb. 17, 1948 |
| 2,466,776 | May | Apr. 12, 1949 |
| 2,470,567 | May | May 17, 1949 |
| 2,472,979 | May | June 14, 1949 |
| 2,517,854 | Elliott | Aug. 8, 1950 |

FOREIGN PATENTS

| Number | Country | Date |
|---|---|---|
| 601,134 | Great Britain | Apr. 28, 1948 |
| 980,697 | France | May 16, 1951 |